US012015900B2

(12) United States Patent
Hariharan et al.

(10) Patent No.: US 12,015,900 B2
(45) Date of Patent: *Jun. 18, 2024

(54) SWAPPING ROLES BETWEEN UNTETHERED WIRELESSLY CONNECTED DEVICES

(71) Applicant: Apple Inc., Cupertino, CA (US)

(72) Inventors: Sriram Hariharan, San Jose, CA (US); Ganesha Adkasthala Ganapathi Batta, San Jose, CA (US); Tad J. Dreier, Castro Valley, CA (US); Christopher S. Wiebe, Cupertino, CA (US); Ashley N. Saulsbury, Los Gatos, CA (US); Duy N. Phan, San Jose, CA (US); David J. Shaw, Ramona, CA (US); Robert D. Watson, Menlo Park, CA (US); Augustin Prats, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 17/657,947

(22) Filed: Apr. 4, 2022

(65) Prior Publication Data

US 2022/0232333 A1 Jul. 21, 2022

Related U.S. Application Data

(63) Continuation of application No. 17/011,958, filed on Sep. 3, 2020, now Pat. No. 11,297,453, which is a
(Continued)

(51) Int. Cl.
*H04R 29/00* (2006.01)
*H04R 1/10* (2006.01)
*H04R 5/033* (2006.01)

(52) U.S. Cl.
CPC ......... *H04R 29/001* (2013.01); *H04R 1/1041* (2013.01); *H04R 1/1016* (2013.01);
(Continued)

(58) Field of Classification Search
CPC .. H04R 29/001; H04R 1/1041; H04R 1/1016; H04R 1/1025; H04R 5/033;
(Continued)

(56) References Cited

U.S. PATENT DOCUMENTS 8,208,917 B2 6/2012 Ueda
8,396,424 B2 3/2013 Frazier
(Continued)

FOREIGN PATENT DOCUMENTS

CN 101695189 A 4/2010
CN 101874396 A 10/2010
(Continued)

OTHER PUBLICATIONS

International Patent Application No. PCT/US2017/028835—International Search Report and Written Opinion dated Jul. 28, 2017.
(Continued)

*Primary Examiner* — Vivian C Chin
*Assistant Examiner* — Con P Tran
(74) *Attorney, Agent, or Firm* — DICKINSON WRIGHT RLLP

(57) ABSTRACT

Systems, methods, and non-transitory computer-readable storage media for performing a role swapping operation between a pair of non-tethered wireless ear buds after detecting a triggering event. Further, state information can be coordinated between devices, including in connection with performing a role swap between buds in a pair of wireless, untethered ear buds, where one wireless ear bud is in a primary role and is responsible for a connection with a
(Continued)

companion device, and another wireless ear bud in the pair is in a secondary role.

20 Claims, 11 Drawing Sheets

Related U.S. Application Data continuation of application No. 16/162,200, filed on Oct. 16, 2018, now Pat. No. 10,771,908, which is a continuation of application No. 15/136,714, filed on Apr. 22, 2016, now Pat. No. 10,142,750.

(52) U.S. Cl.
CPC ............ *H04R 1/1025* (2013.01); *H04R 5/033* (2013.01); *H04R 2420/03* (2013.01); *H04R 2420/05* (2013.01); *H04R 2420/07* (2013.01); *H04R 2460/03* (2013.01); *H04R 2460/17* (2013.01)

(58) Field of Classification Search
CPC ............ H04R 2420/03; H04R 2420/05; H04R 2420/07; H04R 2460/03; H04R 2460/17
USPC ................ 381/58, 374, 380; 455/41.2, 569.1
See application file for complete search history.

(56) References Cited

U.S. PATENT DOCUMENTS

| | | | |
|---|---|---|---|
| 8,655,280 | B2 | 2/2014 | Hillyard et al. |
| 9,462,109 | B1 | 10/2016 | Frazier Fields et al. |
| 9,622,020 | B2 | 4/2017 | Yato |
| 9,681,277 | B2 | 6/2017 | Lee |
| 9,801,213 | B2 | 10/2017 | Terashita |
| 10,142,750 | B2 | 11/2018 | Hariharan et al. |
| 10,244,468 | B2 | 3/2019 | Newham |
| 2006/0072525 | A1 | 4/2006 | Hillyard et al. |
| 2007/0223725 | A1 | 9/2007 | Neumann et al. |
| 2008/0187162 | A1 | 8/2008 | Lee |
| 2008/0226094 | A1 | 9/2008 | Rutschman |
| 2009/0154720 | A1 | 6/2009 | Oki |
| 2009/0154739 | A1 | 6/2009 | Zellner |
| 2009/0197532 | A1 | 8/2009 | Wyper |
| 2010/0020982 | A1 | 1/2010 | Brown et al. |
| 2010/0322222 | A1 | 12/2010 | Desai |
| 2011/0286615 | A1 | 11/2011 | Olodort et al. |
| 2012/0020492 | A1 | 1/2012 | Brown et al. |
| 2012/0230510 | A1 | 9/2012 | Dinescu et al. |
| 2013/0099892 | A1 | 4/2013 | Tucker et al. |
| 2013/0316642 | A1 | 11/2013 | Newham |
| 2014/0254818 | A1 | 9/2014 | Tse et al. |
| 2014/0298309 | A1 | 10/2014 | Proschowsky |
| 2014/0341399 | A1 | 11/2014 | Dusse et al. |
| 2015/0312685 | A1 | 10/2015 | Huettinger et al. |
| 2016/0080868 | A1 | 3/2016 | Hensen |
| 2016/0157026 | A1 | 6/2016 | Guindi et al. |
| 2016/0234786 | A1 | 8/2016 | Gaja et al. |
| 2017/0311105 | A1 | 10/2017 | Hariharan et al. |
| 2019/0052984 | A1 | 2/2019 | Hariharan et al. |

FOREIGN PATENT DOCUMENTS

| | | |
|---|---|---|
| CN | 102696240 A | 9/2012 |
| CN | 103825635 A | 5/2014 |
| CN | 104335642 A | 2/2015 |
| CN | 104641720 A | 5/2015 |
| CN | 104685905 A | 6/2015 |
| CN | 204539449 U | 8/2015 |
| CN | 105409245 A | 3/2016 |
| CN | 206042295 U | 3/2017 |
| JP | 2004120313 A | 4/2004 |
| JP | 2006050381 A | 2/2006 |
| JP | 2009152666 A | 7/2009 |
| JP | 2013504937 A | 2/2013 |
| JP | 2016005069 A | 1/2016 |
| KR | 20080114753 A | 12/2008 |
| WO | 2009126614 A1 | 10/2009 |
| WO | 2011031910 A1 | 3/2011 |
| WO | 2012161927 A1 | 11/2012 |
| WO | 2015018456 A1 | 2/2015 |

OTHER PUBLICATIONS

Korean Patent Application No. 10-2018-7005978—Notice of Preliminary Rejection dated Jan. 21, 2019.
Japanese Patent Application No. 2018-510940—First Office Action dated Feb. 15, 2019.
European Patent Application No. 17786713.2—Extended European Search Report dated Mar. 28, 2019.
Korean Patent Application No. 10-2018-7005978—Notice of Allowance dated May 22, 2019.
Japanese Patent Application No. 2018-510940—Office Action dated Sep. 20, 2019.
Chinese Patent Application No. 201780002928.5—First Office Action dated Nov. 27, 2019.
European Patent Application No. 17786713.2—OA dated Dec. 17, 2019.
Australian Patent Application No. 2019202292—Examination Report No. 1 dated May 19, 2020.
Korean Patent Application No. 10-2020-7002741—Notice of Preliminary Rejection dated May 29, 2020.
Japanese Patent Application No. 2020-017178—Office Action dated Jan. 29, 2021.
Chinese Patent Application No. 202110217033.1—First Office Action dated Nov. 10, 2022.
European Patent Application No. 22152599.1—Commucation purusuant to Article 94(3) EPC dated Feb. 22, 2023.
European Patent Application No. 22152599.1—Extended European Search Report dated Mar. 31, 2022.
Brazil Patent Application No. BR112018004057-6—Preliminary Office Action dated Jan. 3, 2024.

```
299
```

- 283 — Wirelessly Connecting A First Wireless Ear Bud To A Companion Device
- 285 — Establishing A Wireless Connection Between The First Wireless Ear Bud And A Second Wireless Ear Bud
- 287 — Taking A Primary Role For Sharing The Audio Signals With The Second Wireless Ear Bud Via The Wireless Connection
- 289 — Detecting A Triggering Event
- 291 — Determining That A Role Swap Can Proceed
- 293 — Requesting that the Companion Device Temporarily Stop Sending Data Over the Wireless Connection Between the Wireless Ear Bud In The Primary Role And The Companion Device
- 295 — Transferring State Information From The Wireless Ear Bud In The Primary Role To The Wireless Ear Bud Previously In The Secondary Role
- 297 — Re-assigning The Primary Role To The Wireless Ear Bud Previously In The Secondary Role
- 298 — Resume Data Transfer Between The Companion Device And The Wireless Ear Bud Previously In The Secondary Role And Now In The Primary Role

FIG. 2B

SWAPPING ROLES BETWEEN UNTETHERED WIRELESSLY CONNECTED DEVICES

CROSS-REFERENCE TO RELATED APPLICATIONS

The present application is a continuation of U.S. application Ser. No. 17/011,958, filed Sep. 3, 2020, entitled "SWAPPING ROLES BETWEEN UNTETHERED WIRELESSLY CONNECTED DEVICES," set to issue Apr. 5, 2022 as U.S. Pat. No. 11,297,453, which is a continuation of U.S. application Ser. No. 16/162,200, filed Oct. 16, 2018, entitled "SWAPPING ROLES BETWEEN UNTETHERED WIRELESSLY CONNECTED DEVICES," issued Sep. 8, 2020 as U.S. Pat. No. 10,771,908, which is a continuation of U.S. application Ser. No. 15/136,714, filed Apr. 22, 2016, entitled "SWAPPING ROLES BETWEEN UNTETHERED WIRELESSLY CONNECTED DEVICES," issued Nov. 27, 2018 as U.S. Pat. No. 10,142,750, the contents of all of which are incorporated by reference herein in their entirety for all purposes.

TECHNICAL FIELD

The present technology pertains to coordinating state information between devices, including to swapping roles between wireless audio devices.

BACKGROUND

Personal audio playback devices are commonly designed as a pair of speakers worn in or over a user's ears and tethered to one another by a wire. The speakers are also typically wired to an audio device, such as a portable electronic device that is configured to play audio.

Some personal audio playback devices are configured to wirelessly connect with a portable electronic device. These audio playback devices typically involve a pair of speakers tethered to one another by a wire, the speakers having dedicated roles.

SUMMARY

Features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosure describes systems, methods, and computer-readable media for coordinating state information between devices, including performing a role swap between buds in a pair of wireless, untethered ear buds, where one wireless ear bud is in a primary role and is responsible for a connection with a companion device (e.g. smartphone, watch, etc.), and another wireless ear bud in the pair is in a secondary role. In some implementations, the role swap can be transparent to the companion device (i.e., the role swap occurs without the knowledge of the companion device). Such a role swap might be necessary or useful, for example, if the wireless ear bud in the secondary role is determined to be in use (e.g., in a user's ear) while the wireless ear bud in the primary role is determined not to be in use (e.g., outside the user's ear), or for other such conditions, for example when the battery level of the wireless ear bud in the primary role is low and needs to be charged, while the wireless ear bud in the secondary role has sufficient power.

The method for executing a swap can depend on the wireless connection protocol (synchronous or asynchronous) between a wireless ear bud in a primary role and the companion device. In an asynchronous connection, such as utilized in music streaming, the wireless ear bud in the primary role (e.g., the right ear bud) can request the companion device to temporarily stop sending data over the connection between the wireless ear bud in the primary role and the companion device, while leaving the connection session between the wireless ear bud and the companion device intact. During this temporary cessation in data transfer, the wireless ear bud in the primary role (the right ear bud) and the wireless ear bud in the secondary role (the left ear bud) can exchange state data and swap roles, such that the wireless ear bud previously in the secondary role (the left ear bud) assumes the primary role. Once the wireless ear bud that was in the secondary role (the left ear bud) takes over the primary role, the companion device resumes sending data, now to the wireless ear bud that took over the primary role (the left ear bud). The companion device may be unaware that the wireless ear bud in the secondary role (the left ear bud) has assumed the primary role, as that wireless ear bud has assumed the primary role, has complete state information, and has adopted the necessary address(es) and/or identifier(s) previously used to identify the wireless ear bud previously in the primary role (the right ear bud). In such a manner, the role swap can be transparent to the companion device.

In a synchronous connection, such as used for voice communication, the wireless ear bud in the primary role does not request the companion device to temporarily stop the transfer of data. Instead, the wireless ear bud in the primary role and the wireless ear bud in the secondary role perform the role swap while data is being transferred. Since data transfer is not interrupted the companion device may be unaware of the swap.

In some embodiments, the wireless ear bud in the primary role will be communicating data under both synchronous and asynchronous sessions at the same time, in which case each session can be handled as noted above. Transmission of the asynchronous session data will be temporarily halted, while transmission of the synchronous session data will continue. Again, the swap can be performed such that it is transparent to the companion device.

Some embodiments of the present technology involve swapping roles between a pair of untethered wireless ear buds by wirelessly connecting a first wireless ear bud to a companion device, routing audio signals from the companion device to the first wireless ear bud, and creating a wireless link between the first wireless ear bud and a second wireless ear bud, with the first wireless ear bud assuming a primary role for sharing some or all of the audio signals with the second wireless ear bud via their wireless link.

Any of the first wireless ear bud, the second wireless ear bud, and the companion device can detect a triggering event and can initiate a role swap where the wireless ear bud in a primary role swaps roles with the wireless ear bud in a secondary role. In some embodiments of the present technology, swapping roles can involve requesting that the companion device temporarily stop sending some or all data over the connection between the wireless ear bud in the primary role and the companion device. While the transfer of data is temporarily stopped, the wireless ear buds can transfer state information and the wireless ear bud previously in the secondary role can connect to the companion device as the wireless ear bud now in the primary role. Data transfer can then be resumed between the companion device and the wireless ear bud that is now in the primary role. In some embodiments of the present technology, data transfer is not halted during the wireless ear bud swap. Also, in some embodiments, state data can be transferred between the wireless ear buds before initiating a role swap, thereby minimizing the time required to perform the role swap.

While reference is made to ear buds throughout this document, it will be appreciated that the disclosure can be applied to other device types, including headphones, speakers, other audio devices, sensors, other wearable sensory devices, or other paired devices in an established communication session with another device.

BRIEF DESCRIPTION OF THE DRAWINGS

To describe the manner in which the above-recited and other advantages and features of the disclosure can be obtained, a more particular description of the principles briefly described above will be rendered by reference to specific embodiments thereof, which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 2B illustrates an example method of swapping roles between a pair of untethered wireless ear buds;

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1A:
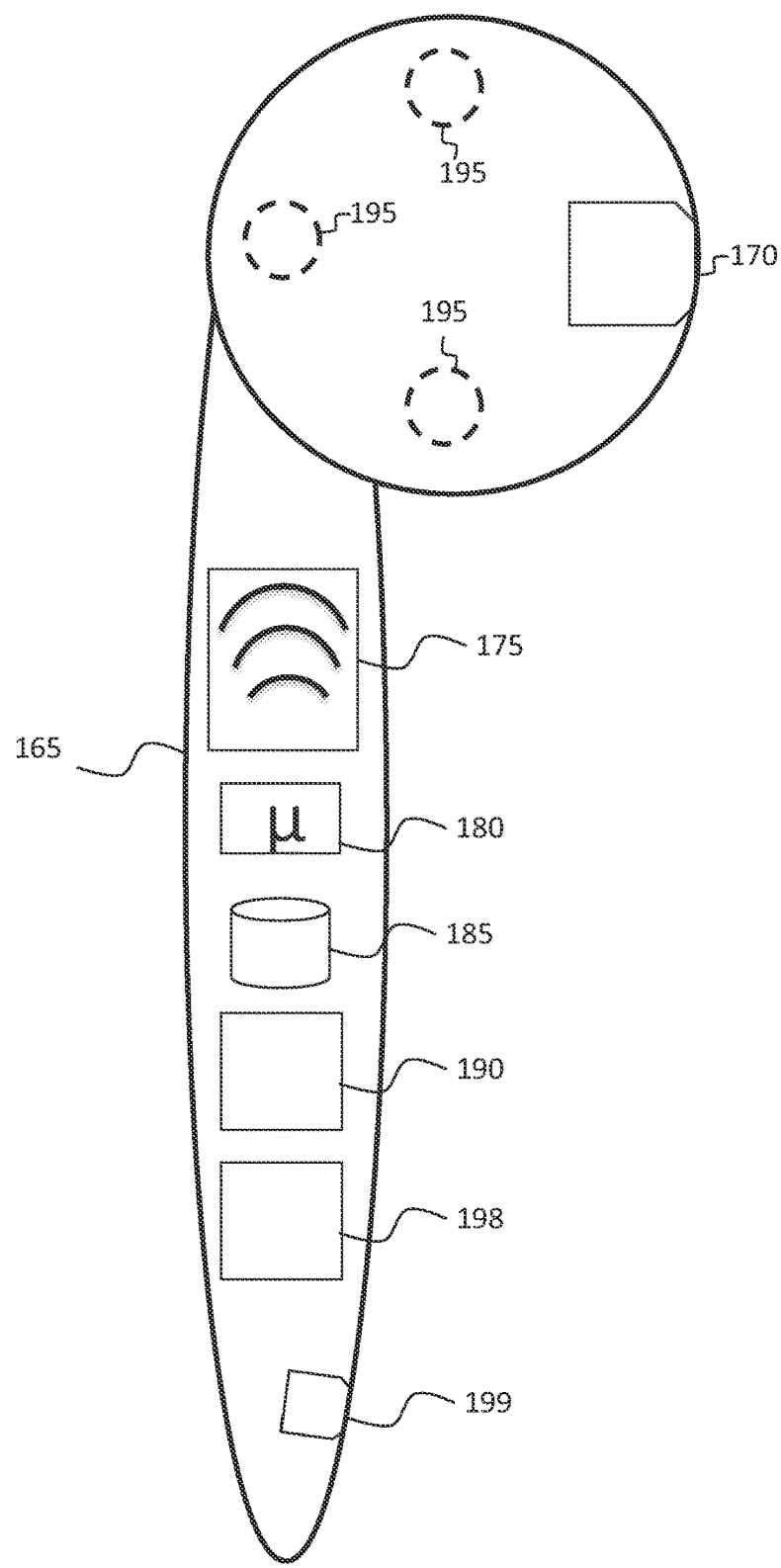
FIG. 1A illustrates an example wireless ear bud that wirelessly couples with a companion device.

FIG. 1A illustrates a wireless ear bud 165 that can wirelessly connect with a companion device according to some embodiments of the present technology. The wireless ear bud 165 includes a communication interface 175 used to wirelessly connect with the companion device (e.g., to create a BLUETOOTH® link). The communication interface 175 can also be used to wirelessly connect with another wireless ear bud to form a pair of non-tethered (i.e., not physically connected), wireless ear buds. The communication interface 175 can be configured to communicate using any wireless protocol or combination of wireless protocols.

The wireless ear bud 165 includes an audio output device 170 for converting a received audio signal into sound. The audio signal can be received from a wirelessly connected companion device (not shown) via the communication interface 175. The wireless ear bud 165 also can include any or all of a processor 180, memory 185, a battery 190, a microphone 199, and one or more sensors 195. The one or more sensors 195 can be used to determine environmental and/or operational characteristics, e.g., detecting when the wireless ear bud 165 is placed in an ear and/or removed from an ear, as well as whether the wireless ear bud 165 is situated in an ear or outside of an ear. The sensors 195 can include any type(s) of sensors that can detect when the wireless ear bud is in a user's ear. For example, the sensors can include any or all of optical proximity sensors, pressure sensors, heat sensors, moisture sensors, etc. The sensors 195 also can include motion sensors (e.g., gyroscope, accelerometer, etc.), biometric sensors, and/or sensors configured to capture environmental data.

As explained above, the wireless ear bud 165 can be wirelessly connected with another wireless ear bud to form a pair of non-tethered (not physically connected), wireless ear buds. In some cases, one of the wirelessly connected wireless ear buds takes a primary role and one of the wirelessly connected wireless ear buds takes a secondary role. The wireless ear bud in the primary role can wirelessly connect to a companion device, receive audio data from the companion device, provide connection information to the wireless ear bud in the secondary role (so that the wireless ear bud in the secondary role can listen in (or "snoop") on the connection between the wireless ear bud in the primary role and the companion device), receive in-ear status information from the wireless ear bud in the secondary role, and send to the companion device data regarding the in-ear status of the wireless ear bud in the primary role and the wireless ear bud in the secondary role. The wireless ear bud 165 also includes a bud swap manager 198 for determining when to swap the roles of the pair of non-tethered, wireless ear buds, as explained in greater detail below. Although wireless ear buds are described, those with ordinary skill in the art will readily appreciate that the present technology can be used in a wide variety of peripheral devices including other headphone devices, other audio devices, other wearable sensory devices, wireless speakers, etc.

Figure 1B:
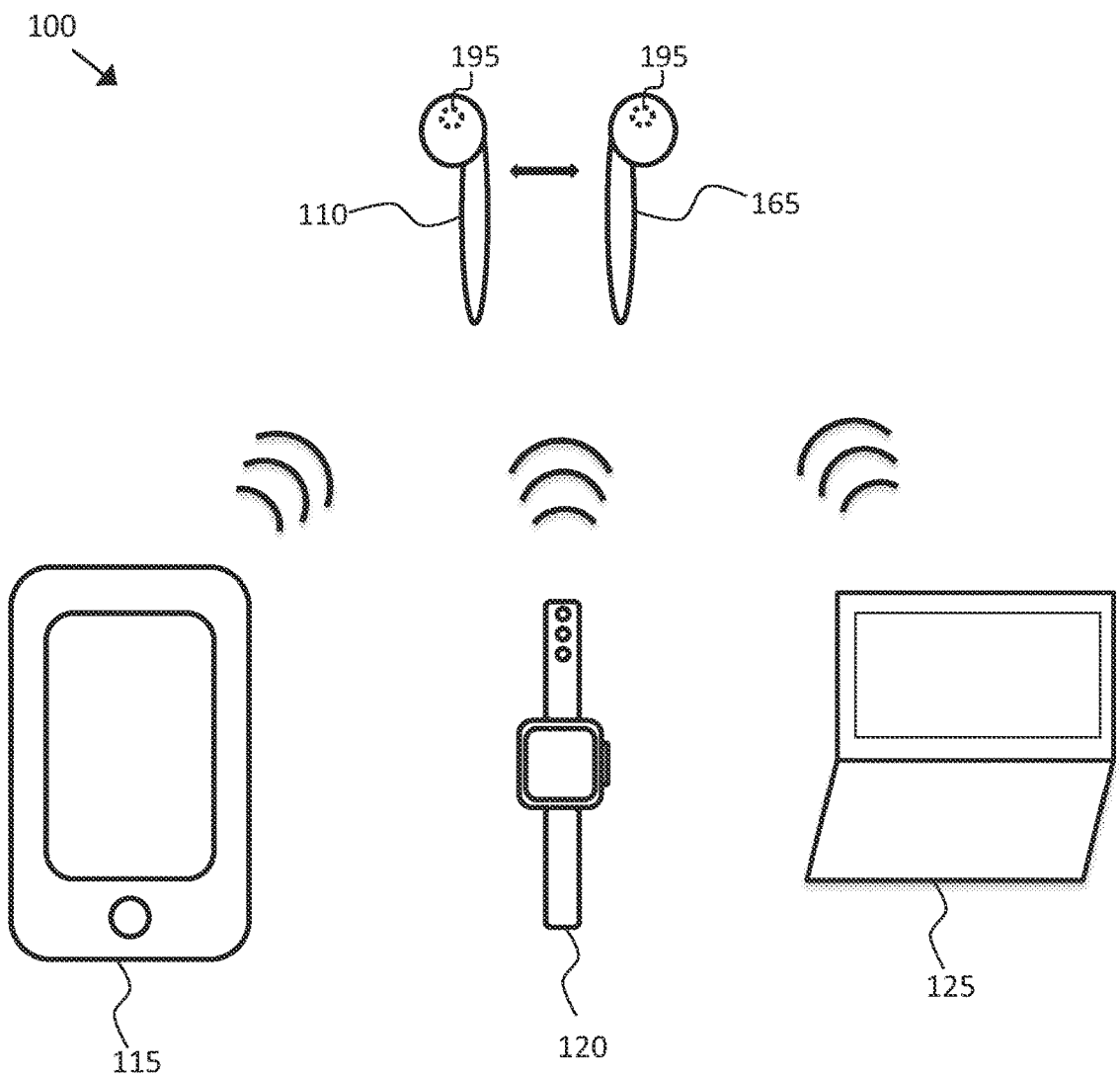
FIG. 1B illustrates an example system having two wireless ear buds wirelessly connected with one or more companion devices.

FIG. 1B illustrates a system 100 including two wirelessly connected wearable, non-tethered wireless ear buds 165, 110 wirelessly connected with one or more companion devices 115, 120, 125 according to some embodiments of the present technology. As shown, the wireless ear bud 165 serves as a wireless ear bud in a primary role and wireless ear bud 110 serves as a wireless ear bud in a secondary role. The wireless ear bud in the primary role 165 can wirelessly connect with any/all of the companion devices 115, 120, 125 and can provide connection information to wireless ear bud 110 in the secondary role so that wireless ear bud 110 can listen in ("snoop") on the connection between the wireless ear bud in the primary role 165 and a companion device 115, 120, 125. In some embodiments, the wireless ear bud in the primary role 165 can route the audio data received from one or more of the companion devices 115, 120, 125 to the wireless ear bud in the secondary role 110.

Additionally, the wireless ear buds 165, 110 can detect, via the sensors 195, when the wireless ear buds 165, 110 are inserted into and/or removed from a user's ear, as well as whether the wireless ear buds 165, 110 are situated in an ear and/or outside of an ear. The wireless ear bud in the primary role 165 can receive data from the wireless ear bud in the secondary role 110 that describes its associated wearing status. In some implementations, the wireless ear bud in the primary role 165 also can transmit data to the wireless ear bud in the secondary role 110 that describes its wearing status. Also, the wireless ear bud in the primary role 165 can transmit its own wearing status and/or the wearing status of the wireless ear bud in the secondary role 110 to any/all of the companion devices 115, 120, 125 with which it is wirelessly connected. Likewise, the wireless ear bud in the primary role 165 can receive data from any/all of the wirelessly connected companion devices 115, 120, 125 that reflects events occurring on the companion devices or changed behaviors of the companion devices 115, 120, 125.

Figure 1C:
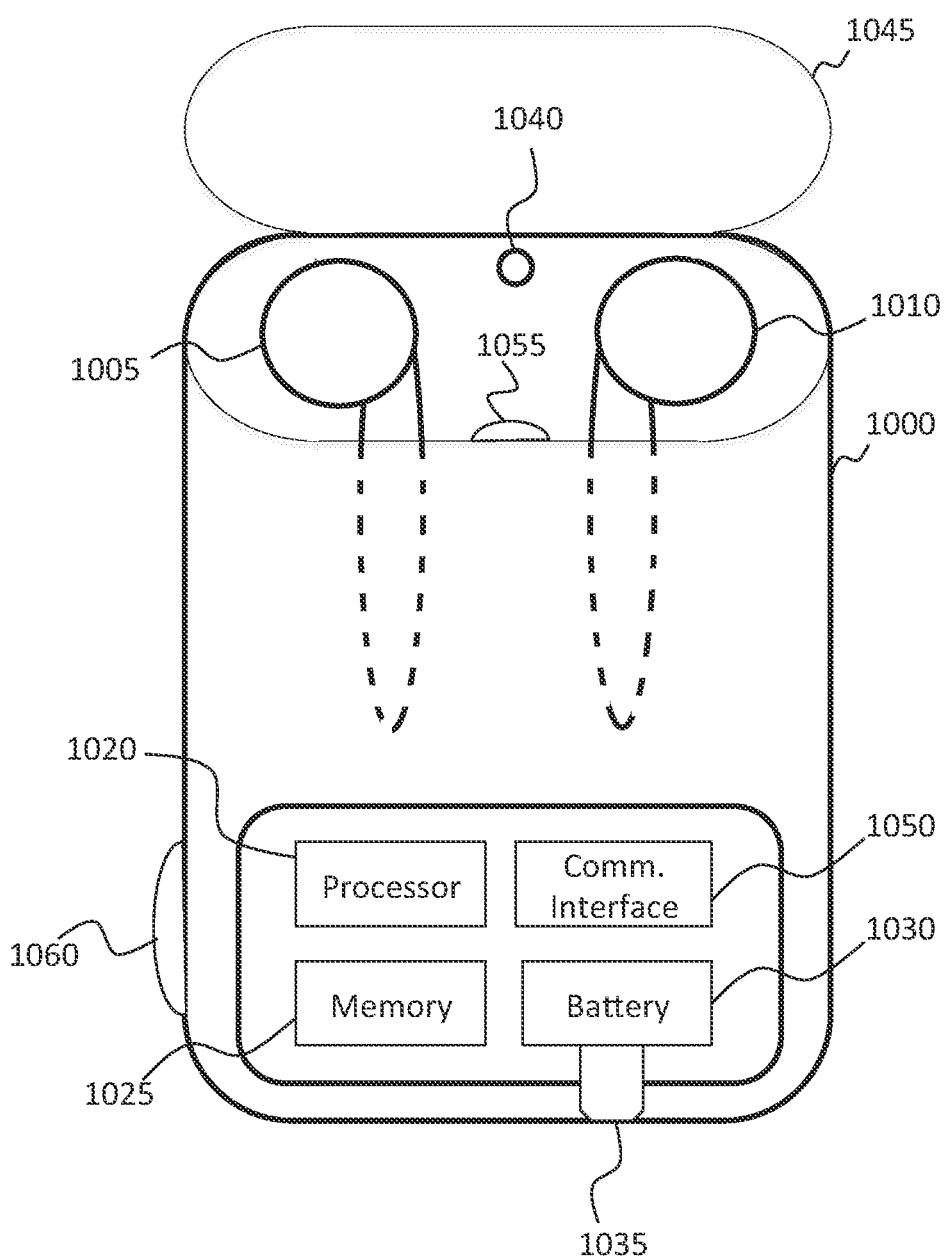
FIG. 1C illustrates an example ear bud case.

FIG. 1C illustrates an ear bud case 1000 according to some embodiments of the present technology. The ear bud case 1000 can house a pair of wireless ear buds 1005, 1010 and can connect the wireless ear buds 1005, 1010, e.g., while housed within the ear bud case 1000. The ear bud case 1000 can include a cover 1045 that closes to cover the wireless ear buds within the ear bud case 1000. The ear bud case 1000 also can include a sensor 1055 that detects when the cover 1045 is opened and/or closed. In some embodiments, the wireless ear buds 1005, 1010 are configured to attempt to wirelessly connect with a companion device automatically when the cover 1045 opens.

The ear bud case 1000 includes a battery 1030 for charging the wireless ear buds 1005, 1010 and a charging interface 1035 for connecting the battery 1030 to an external power source. The ear bud case 1000 can also include an indicator 1040 to show a charge status of the wireless ear buds 1005, 1010 and/or of the ear bud case 1000. The ear bud case 1000 also can include an input 1060, such as a button, which can be actuated to cause the ear bud case 1000 to perform one or more functions, including attempting to wirelessly connect one or more of the wireless ear buds 1005, 1010 with a known companion device and/or becoming discoverable to other devices. Also, the ear bud case 1000 includes a processor 1020, a communication interface 1050, and a memory 1025.

Figure 2A:
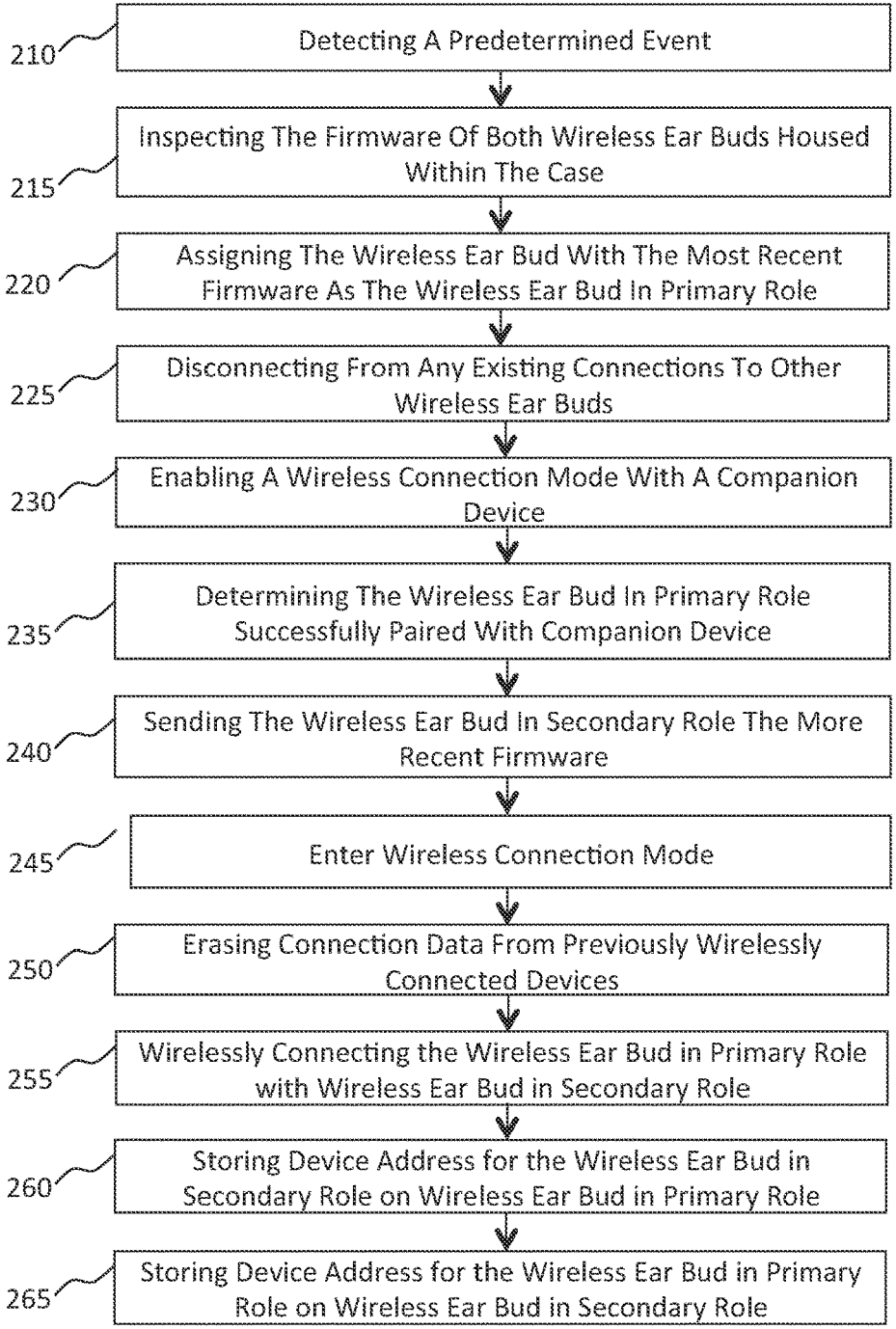
FIG. 2A illustrates an example method of coupling a pair of non-tethered, wireless ear buds.

FIG. 2A illustrates an example method 200 of coupling a pair of non-tethered, wireless ear buds according to some embodiments of the present technology. The method 200 involves the ear bud case detecting a predetermined event 210 (e.g. such as a button being pushed on the case, the case being opened, the case being opened for the first time, etc.). In response to detecting the predetermined event, the method 200 involves the ear bud case inspecting the firmware of both wireless ear buds housed within the case 215 and assigning the wireless ear bud with the most recent firmware version as the wireless ear bud in the primary role 220.

Further, the method 200 involves the ear bud case causing the wireless ear bud in the primary role to disconnect from any existing connections to other wireless ear buds 225 and the wireless ear bud in the primary role enabling a wireless connection mode with a companion device 230. In some embodiments, the method 200 of wirelessly connecting a wireless ear bud in a primary role with another wireless ear bud will only continue when the wireless ear bud in the primary role successfully wirelessly connects with a companion device. The method 200 involves the ear bud case determining that the wireless ear bud in the primary role has successfully wirelessly connected with a companion device 235.

Further, the method 200 can involve the ear bud case causing the wireless ear bud in the primary role to send the wireless ear bud in the secondary role the more recent firmware version 240 and causing the wireless ear bud in the secondary role to enter a wireless connection mode 245. As explained in greater detail below, in some embodiments of the present technology, the method 200 can involve the ear bud case causing either or both of the wireless ear bud in the primary role and the wireless ear bud in the secondary role to erase connection data for wirelessly connecting with previously connected devices 250.

Further, the method 200 involves the ear bud case causing the wireless ear bud in the primary role to wirelessly connect to the wireless ear bud in the secondary role 255, store address information (e.g., a media access control (MAC) address) for the wireless ear bud in the secondary role on the wireless ear bud in the primary role 260, and store address information (e.g., MAC address) for the wireless ear bud in the primary role on the wireless ear bud in the secondary role 265.

As explained above, wireless ear buds in a pair of non-tethered, wireless ear buds can swap roles, exchanging the primary and secondary roles. The swap can be triggered by any of a variety of events and the swapping can be coordinated by the swap manager on each wireless ear bud, or can be uncoordinated and performed by the swap manager on a single wireless ear bud. In some embodiments, one ear bud of the pair of wireless ear buds also can be replaced by a third ear bud, thus forming a different pair. This type of substitution also can be performed in conjunction with a role swap.

A coordinated bud swap can occur when the pair of wireless ear buds are wirelessly linked and can be triggered by several events. When a wireless ear bud in a secondary role is placed in an ear, while the wireless ear bud in a primary role is not in an ear, one or more of the swap manager(s) in the wireless ear buds can determine their roles should be swapped so the wireless ear bud that is in an ear assumes the primary role. Further, the swap managers of each wireless ear bud can coordinate to swap the roles for the pair of wireless ear buds when the battery level of the wireless ear bud in the primary role falls below a threshold level, e.g., when the battery level of the wireless ear bud in the primary role falls below one percent. Of course, the battery threshold level can be set to any other value. The wireless ear buds can also receive an instruction from the companion device indicating that a user requested that the wireless ear buds swap roles. Also, sometimes a coordinated swap will not occur in some circumstances, such as while the wireless ear buds are actively connected to a companion device or during a firmware update.

FIG. 2B illustrates a method 299 of swapping roles between a pair of untethered wireless ear buds according to some embodiments of the present technology. The method 299 involves wirelessly connecting a first wireless ear bud to a companion device 283. The first wireless ear bud can provide a second wireless ear bud with the information about the wireless link between the first wireless ear bud and the companion device so the second wireless ear bud can access ("snoop") the audio signal and so the second wireless ear bud can take over the connection if an uncoordinated bud swap occurs, as explained in greater detail below.

The method 299 can also involve establishing a wireless connection between the first wireless ear bud and the second wireless ear bud 285 and the first wireless ear bud taking on a primary role for sharing the audio signals with the second wireless ear bud via the wireless connection 287. A device can advertise the first wireless ear bud's primary role and the wireless connection can be used to share the device address with the second wireless ear bud to facilitate a subsequent role swap. In some embodiments, wirelessly connecting a first wireless ear bud to a companion device 283 and establishing a wireless connection between the first wireless ear bud and the second wireless ear bud 285 can occur in parallel or substantially in parallel. In some embodiments, a wireless connection between the first wireless ear bud and the second wireless ear bud 285 can be established before wirelessly connecting a first wireless ear bud to a companion device 283.

Next, the method 299 involves detecting a triggering event 289 that can initiate a role swap. Examples of triggering events can include a battery level of the wireless ear bud with the primary role falling below a predetermined percentage (e.g. below one percent), detecting when the wireless ear bud in the primary role detects a change in a status of being worn (e.g. in-ear) to a status of not being worn (e.g. out-of-ear), etc.

After a triggering event is detected, the method 299 can involve determining that a role swap can proceed 291. When one or more of the untethered wireless ear buds is streaming audio data from the companion device, the wireless ear bud in the primary role can request that the companion device examine the metadata of the streaming audio to determine that a break in the streaming music is coming within a threshold period of time. The wireless ear buds can then schedule a role swap to occur at a time when the break in the streaming music occurs. Similarly, the wireless ear bud in the primary role can request that the companion device examine the audio signal and determine (e.g. based on the amplitude of the signal in an audio buffer) that a break is coming within a threshold period of time and the one or more wireless ear buds can schedule a role swap to occur when the break in music occurs.

In some embodiments, determining that a role swap can proceed 291 can involve determining that the first wireless ear bud or the second wireless ear bud is updating firmware and waiting until the firmware update is complete before performing a role swap. Similarly, determining that a role swap can proceed 291 can involve determining that the first wireless ear bud or the second wireless ear bud is performing an automatic wireless connection process with the companion device and waiting until the automatic wireless connection process is complete before performing a role swap.

In some embodiments of the present technology, it is desired to temporarily discontinue certain types of data exchange over the wireless connection between the wireless ear bud in the primary role and the companion device. Therefore, after determining that a role swap can proceed 291, the method 299 can involve requesting that the companion device stop sending some or all data over the connection between the wireless ear bud in the primary role and the companion device 293.

In some embodiments of the present technology, the wireless ear bud in the primary role can request that the companion device stop sending data over a wireless connection link established under a first protocol with the companion device, while maintaining data exchange over a wireless connection link established under a second protocol. A companion device can be connected to wireless ear bud over a first protocol, such as an asynchronous connection-less (ACL) link (e.g., for music streaming, volume control commands, etc.) and a second protocol such as a synchronous connection-oriented (SCO) link (e.g., for a voice call). A connection over the first protocol and the second protocol may occur simultaneously or only one may be established at a time. While data flow over an ACL link can complicate the role swap procedure, e.g., due to the exchange of state information, data flow over a SCO link can continue during the role swap process. Some embodiments involve the wireless ear bud in the primary role requesting that the companion device temporarily stop sending data over an existing ACL link.

After the request to stop sending some or all data over the connection between the wireless ear bud in the primary role and the companion device, the method 299 can involve transferring state information from the wireless ear bud in the primary role (e.g., the right ear bud) to the wireless ear bud previously in the secondary role 295 (e.g., the left ear bud), and re-assigning the primary role to the wireless ear bud previously in the secondary role 297 (e.g., the left ear bud). A characteristic of the ear bud in the primary role is that it advertises its device address (e.g., MAC address). This can be done to maintain the connection with the companion device, and it can be a signal that the ear bud is configured in the primary role. Accordingly, swapping the primary role to the ear bud previously in the secondary role can involve the ear bud previously in the secondary role advertising the device address (e.g., MAC address) of the ear bud previously in the primary role to the companion device. Data transfer can then be resumed between the companion device and the wireless ear bud previously in the secondary role that is now in the primary role 298.

Figure 3:
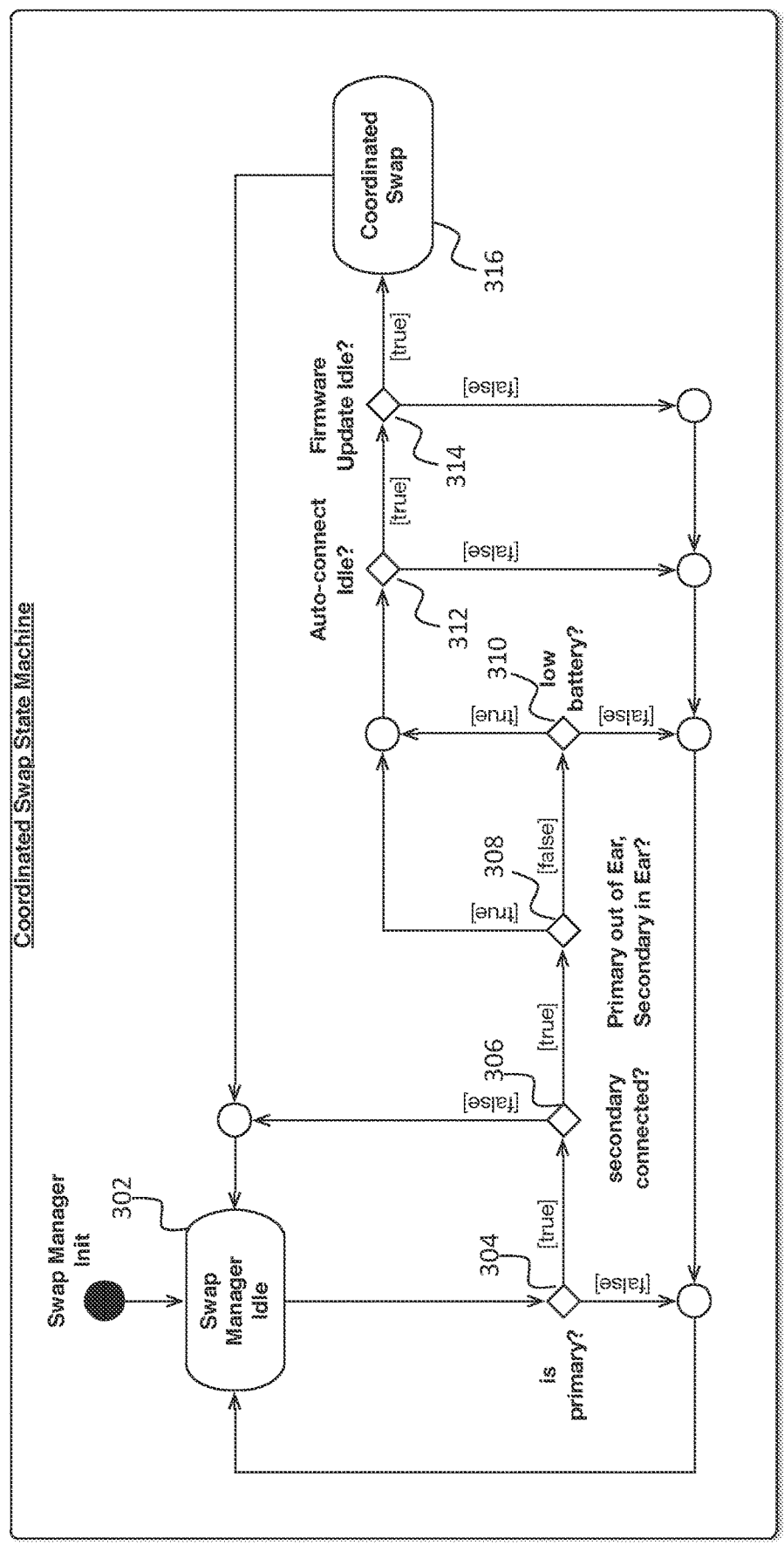
FIG. 3 illustrates an example flow of a swap manager on a wireless ear bud determining when to perform a coordinated wireless ear bud swap.

FIG. 3 illustrates an example of a method 300 executed by a swap manager on one or more wireless ear buds in a non-tethered pair of wireless ear buds to determine when to perform a coordinated wireless ear bud swap according to some embodiments of the present technology. A coordinated swap is achieved when both ear buds in the pair are aware of the swap (i.e., the swap is coordinated).

In general, the method includes the ear bud in the primary role recognizing that it is in the primary role and that it is paired with another ear bud in the secondary role. Then the ear bud in the primary role carries out the coordinated swap after detecting a swap triggering event and determining that none of the conditions that would prevent a swap exist.

In more detail, the example method 300 involves a swap manager staying idle 302 and periodically determining 304 whether it is the wireless ear bud in a primary role. If it is not in the primary role, the swap manager remains idle 302. If the wireless ear bud is in the primary role, the swap manager determines 306 whether a wireless ear bud in the secondary role is connected to the wireless ear bud in the primary role. If an ear bud in a secondary role is not connected, the swap manager remains idle 302.

If a wireless ear bud in the secondary role is wirelessly connected to the wireless ear bud in the primary role, the swap manager determines 308 whether the wireless ear bud in the primary role is out of an ear (not being worn) while the wireless ear bud in the secondary role is in an ear. If that condition is not met, the swap manager determines the battery level of the wireless ear bud in the primary role 110 to determine if the battery level of the wireless ear bud in the primary role is low (e.g., at or below a threshold indicating a low battery level). The swap manager can determine that the battery level of the wireless ear bud in the primary role is low if it satisfies any of one or more conditions, such as the ear bud's battery is at, e.g., one-percent level or the ear bud's battery level is a threshold level below the battery level of the ear bud in the secondary role, such as a battery level of ten percent or more below that of the ear bud in the secondary role, etc.

If the swap manager determines that either of the triggering events 308, 310, has occurred, the swap manager determines if the wireless ear buds are trying to wirelessly connect with the companion device 312 or if either or both of the wireless ear buds are updating their firmware 314. If the wireless ear buds are not trying to wirelessly connect to a companion device and are not in the process of updating firmware, the swap manager performs a coordinated role swap between the wireless ear bud in the primary role and the wireless ear bud in the secondary role 316.

Similarly, sometimes the swap managers on each wireless ear bud can coordinate swapping the roles of paired wireless ear buds as their battery levels drop. The wireless ear bud in the primary role can be the only wireless ear bud in the pair with an active microphone while the microphone of the wireless ear bud in the secondary role is disabled, causing the wireless ear bud with the activate microphone to consume power more quickly. The swap manager can selectively swap the primary role, and with it the activate microphone, back and forth to balance consumption of the battery life across the pair of wireless ear buds.

Figure 4:
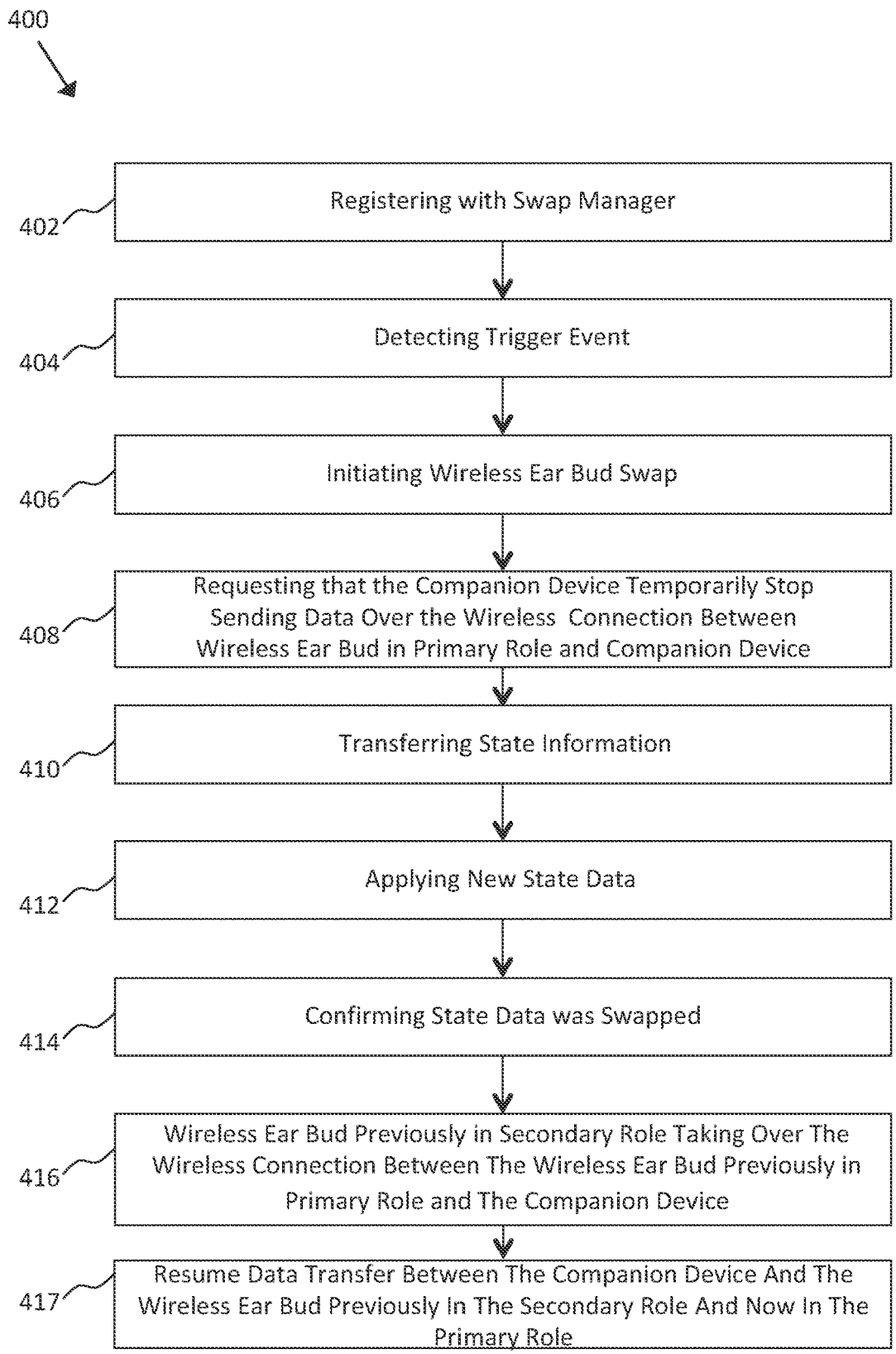
FIG. 4 illustrates an example of a coordinated wireless ear bud swapping method.

After a triggering event is detected, the swap managers can perform a role swap by following a swap protocol. FIG. 4 illustrates an example of a coordinated swapping method according to some embodiments of the present technology. Those with ordinary skill in the art having the benefit of this disclosure will readily appreciate that alternative sequences can be performed to swap the roles of the ear buds.

The method 400 involves the wireless ear bud in the primary role and the wireless ear bud in the secondary role registering various services and software with a swap manager 402. The wireless ear buds can include various components (e.g., applications software, software for discovering another ear bud, an audio manager, a Bluetooth controller, Bluetooth stack software, hardware profiles, etc.) that need to complete any outstanding transactions and be turned off before swapping roles. Next, after detecting a triggering event 404, the method 400 involves initiating the wireless ear bud role swap 406. Sometimes the wireless ear bud in the primary role initiates a wireless ear bud swap request and the swap manager of the wireless ear bud in the primary role sends a swap message to the wireless ear bud in the secondary role to indicate that a wireless ear bud swap has been triggered. The swap manager of the wireless ear bud in the secondary role can send messages to its various components to prepare for the wireless ear bud swap. The swap manager of the wireless ear bud in the secondary role can cause components to complete any outstanding transactions and possibly shut down prior to the swap. Also, the swap manager of the wireless ear bud in the secondary role can cause a communication interface (i.e. a BLUETOOTH controller) to allocate additional bandwidth for a wireless connection with the companion device, since the wireless ear bud in the secondary role will take over the primary role and will take over the connection with the companion device.

Next, the method 400 involves requesting that the companion device temporarily stop sending some or all data to the wireless ear bud in the primary role over the wireless connection 408. In some embodiments, this can involve the wireless ear bud in the primary roll requesting that the companion device stop sending data over an existing ACL link, while maintaining data exchange over a SCO link.

After some or all data exchange is suspended between the wireless ear bud in the primary roll and the companion device, the method 400 involves coordinating a state transfer between the wireless ear buds 410. The swap manager on each wireless ear bud can apply the state data of its respective paired ear bud (in some embodiments, only the ear bud in the secondary role must learn the state data pertinent to the connection with the companion device from the ear bud in the primary role) 412. The swap managers can confirm that the state information was successfully swapped and updated 414.

Next, the method 400 involves the wireless ear bud previously in the secondary role taking over the primary role and the wireless connection with the companion device 416. In some embodiments, the wireless ear bud previously in the secondary role (e.g., the left ear bud) adopts the device address (e.g. MAC address) of the wireless ear bud previously in the primary role (e.g., the right ear bud) during the earlier state transfer and establishes the wireless connection with the companion device by using the device address from the wireless ear bud previously in the primary role (e.g., the right ear bud) as its device address. Data transfer is then resumed between the companion device and the wireless ear bud previously in the secondary role (e.g., the left ear bud) that is now in the primary role 417.

Some embodiments of the present technology also include an uncoordinated bud swap in which only one of the wireless ear buds switches its role and does so without coordinating with its wirelessly connected or previously wirelessly connected corresponding wireless ear bud. When a wireless connection between the wireless ear bud in a primary role (e.g., the right ear bud) and a wireless ear bud in a secondary role (e.g., the left ear bud) is disconnected, the wireless ear bud in the secondary role (e.g., the left ear bud) cannot find the wireless ear bud in the primary role (e.g., the right ear bud). Thus, the ear bud in the secondary role (e.g., the left ear bud) can perform an uncoordinated swap to take on the primary role. For example, this can occur if the ear bud in the primary role (e.g., the right ear bud) fails, is lost, etc. In some embodiments, the wireless ear bud in a secondary role only performs the uncoordinated swap in certain situations (e.g. the wireless ear bud in a secondary role detects an in-ear status).

In some embodiments, after a wireless ear bud in a secondary role detects that a wireless ear bud in a primary role is no longer connected to the wireless ear bud in the secondary role, the swap manager of the wireless ear bud in the secondary role can attempt to re-connect to the wireless ear bud in the primary role. The swap manager on the wireless ear bud in a secondary role can try a predetermined number of times or for a predetermined duration to re-connect to the wireless ear bud in the primary role. Also, certain events (e.g. detecting change from out-of-ear status to in-ear status) can cause the swap manager of the wireless ear bud in a secondary role to bypass retry attempts or reduce the number/duration of retry attempts and begin an uncoordinated swap. Once the wireless ear bud previously in the secondary role swaps roles to become the wireless ear bud in the primary role, it can take over the wireless connection with the companion device as the wireless ear bud in the primary role.

Similarly, a wireless ear bud in a primary role can perform an uncoordinated swap to become a wireless ear bud in a secondary role. Sometimes a wireless ear bud in a primary role can detect a companion device, attempt to establish a wireless connection with the companion device, and receive an error message from the companion device that a wireless connection already exists with another wireless ear bud in a primary role. For example, two wireless ear buds can be wirelessly connected to each other and also wirelessly connected to a companion device. Then the wireless ear bud in a primary role (e.g., the right ear bud) can move out of range of the wireless ear bud in a secondary role (e.g., the left ear bud) and the wireless connection between the wireless ear bud in a primary role and wireless ear bud in a secondary role can be lost, despite the wireless ear bud in the secondary role still being within a wireless connection range of the companion device. The wireless ear bud in a secondary role can perform an uncoordinated swap and take on the primary role. As explained above, the wireless ear bud in a primary role provides the wireless ear bud in a secondary role with the information about the wireless connection between the wireless ear bud in a primary role and the companion device so that the wireless ear bud in a secondary role can access the audio signals and so that the wireless ear bud in a secondary role can take over the wireless connection with the companion device during an uncoordinated bud swap.

However, when the wireless ear bud previously in the primary role (e.g., the right ear bud)—and still acting as though it is in the primary role because it is unaware that another ear bud has taken over the primary role during an uncoordinated bud swap—returns to a close enough proximity to wirelessly re-connect to the companion device, the wireless ear bud previously in a primary role (e.g., the right ear bud) can try to re-establish the connection as the wireless ear bud in a primary role and receive an error message from the companion device that another wireless ear bud (i.e., the left ear bud, the wireless ear bud previously in the secondary role) is already connected as the wireless ear bud in the primary role. In this scenario, the wireless ear bud initially in primary role (e.g., the right ear bud) can perform an uncoordinated swap to become the wireless ear bud in a secondary role.

Figure 5:
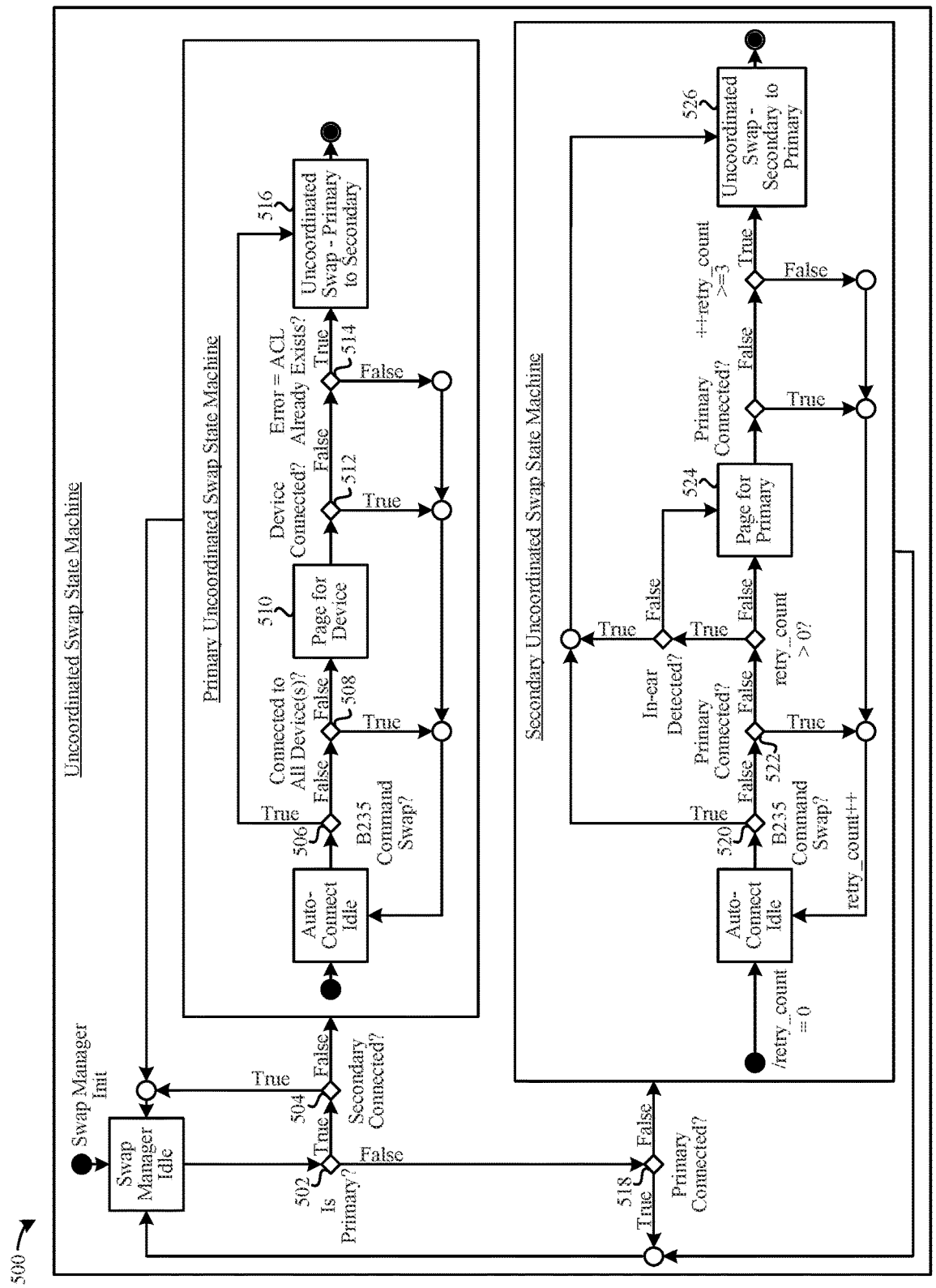
FIG. 5 illustrates an example flow of a swap manager on a wireless ear bud determining when to perform an uncoordinated wireless ear bud swap from a primary role to a secondary role and when to perform an uncoordinated bud swap from a secondary role to a primary role.

FIG. 5 illustrates a method 500 of determining when to perform an uncoordinated wireless ear bud swap from a primary role to a secondary role and when to perform an uncoordinated wireless ear bud swap from a secondary role to a primary role according to some embodiments of the present technology.

The method 500 involves determining whether a wireless ear bud is in a primary role 502. For example, an ear bud can record its status as being in a primary or secondary role. In another example, a wireless ear bud will be able to determine its role based on its state information, and if the wireless ear bud was last maintaining a connection with a companion device using its assigned device address, then the wireless ear bud can determine it is in a primary role, but if the wireless ear bud determines that it was last listening to a connection between another wireless ear bud and a companion device, then the wireless ear bud can determine that it is in a secondary role. When the wireless ear bud is in a primary role, the method 500 involves determining whether a wireless ear bud in a secondary role is connected 504 to the wireless ear bud in the primary role. When the ear bud is in a primary role and determines that a secondary ear bud is connected 504, the swap manager returns to an idle state.

If the wireless ear bud is in the primary role and a wireless ear bud in a secondary role is not connected, the method 500 involves determining whether the wireless ear bud in a primary role has received a command to swap 506. For example, when the wireless ear buds are removed from an ear bud case, the swap managers can require that the wireless buds reconfigure their roles and can command that a the wireless ear buds perform a coordinated swap.

Next, the method 500 involves the swap manager determining 508 whether the wireless ear bud in the primary role is wirelessly connected to a companion device. A wireless ear bud in the primary role can determine that it is wirelessly connected to a companion device when it receives data packets from the companion device over a wireless connection (e.g., BLUETOOTH). If the wireless ear bud in the primary role is not wirelessly connected to a companion device, the wireless ear bud in the primary role can page for a companion device 510. Next, the method 500 involves the wireless ear bud in the primary role determining 512 whether a companion device can be wirelessly connected and attempting to wirelessly connect with the companion device. Further, the ear bud in the primary role can determine whether an error message is received 514 from the companion device indicating a wireless connection already exists between the companion device and another wireless ear bud in a primary role. If an error message is received, the wireless ear bud in the primary role performs an uncoordinated swap 516 to take on a secondary role.

During method 500, when it is determined 502 that the wireless ear bud is in the secondary role, it is further determined whether the ear bud is wirelessly connected to a wireless ear bud in a primary role 518. If the wireless ear bud in a secondary role is connected to a wireless ear bud in a primary role, the swap manager returns to an idle state. If the wireless ear bud in a secondary role is not connected to a wireless ear bud in a primary role, the method 500 involves determining whether the wireless ear bud in the secondary role has received a command to swap its role 520 (e.g. from a bud case, companion device, etc.). If a command to swap its role has not been received, the wireless ear bud in the secondary role determines 522 whether it is connected to a wireless ear bud in a primary role. If a wireless ear bud in a primary role is not connected, the wireless ear bud in the secondary role pages for a wireless ear bud in a primary role 524, e.g., for a predetermined number of times. When the wireless ear bud in the secondary role cannot find a wireless ear bud in a primary role after retrying the predetermined number of times, the wireless ear bud in the secondary role performs an uncoordinated swap 526 to take on the primary role.

In some embodiments, the wireless ear bud in the secondary role can start a reconnect timer to re-establish a wireless connection with a wireless ear bud in a primary role before performing an uncoordinated swap. If the timer expires, the wireless ear bud in the secondary role can swap to take on a primary role and use a device address of a wireless ear bud previously in the primary role to establish a wireless connection with the companion device. When the wireless connection between the previously paired wireless ear buds becomes re-established before one of the wireless ear buds wirelessly re-connects with the companion device, the wireless ear buds can resolve their roles. However, if a wireless connection with the companion device is established first, the companion device can consider the first connected wireless bud as the wireless ear bud in the primary role and the companion device can reject the wireless connection request from the other wireless ear bud, e.g., by issuing an error message. When a wireless ear bud receives an error message it can revert to the secondary role and page to re-establish the wireless connection with the other wireless ear bud.

When the wireless ear bud previously in the secondary role (e.g., the left ear bud, now a wireless ear bud in a primary role) wirelessly connects to the companion device first, it can maintain its status as the wireless ear bud in the primary role and wait for wireless ear bud previously in the primary role (e.g., the right ear bud) to be rejected by the companion device and for the wireless ear bud previously in the primary role (e.g., the right ear bud) to switch to a secondary role before re-establishing the wireless connection between the ear buds.

In some embodiments of the present technology, a user can disable automatic wireless ear bud swapping and can configuring a particular wireless ear bud to act as the designated wireless ear bud in the primary role so that the designated wireless ear bud will always have the active microphone. The non-designated wireless ear bud will act in the secondary role and will not enable the microphone unless the user explicitly chooses this option.

Some companion devices will not return an error message to a wireless ear bud in a primary role when the wireless ear bud in the primary role attempts to wirelessly connect with a companion device while the companion device is already connected to another wireless ear bud in a primary role. This scenario can cause the two or more wireless ear buds in a primary role to compete to wirelessly connect with the companion device. Some embodiments of the present technology involve techniques for avoiding a scenario that results in multiple wireless ear buds in a primary role competing to wirelessly connect with a companion device.

Figure 6:
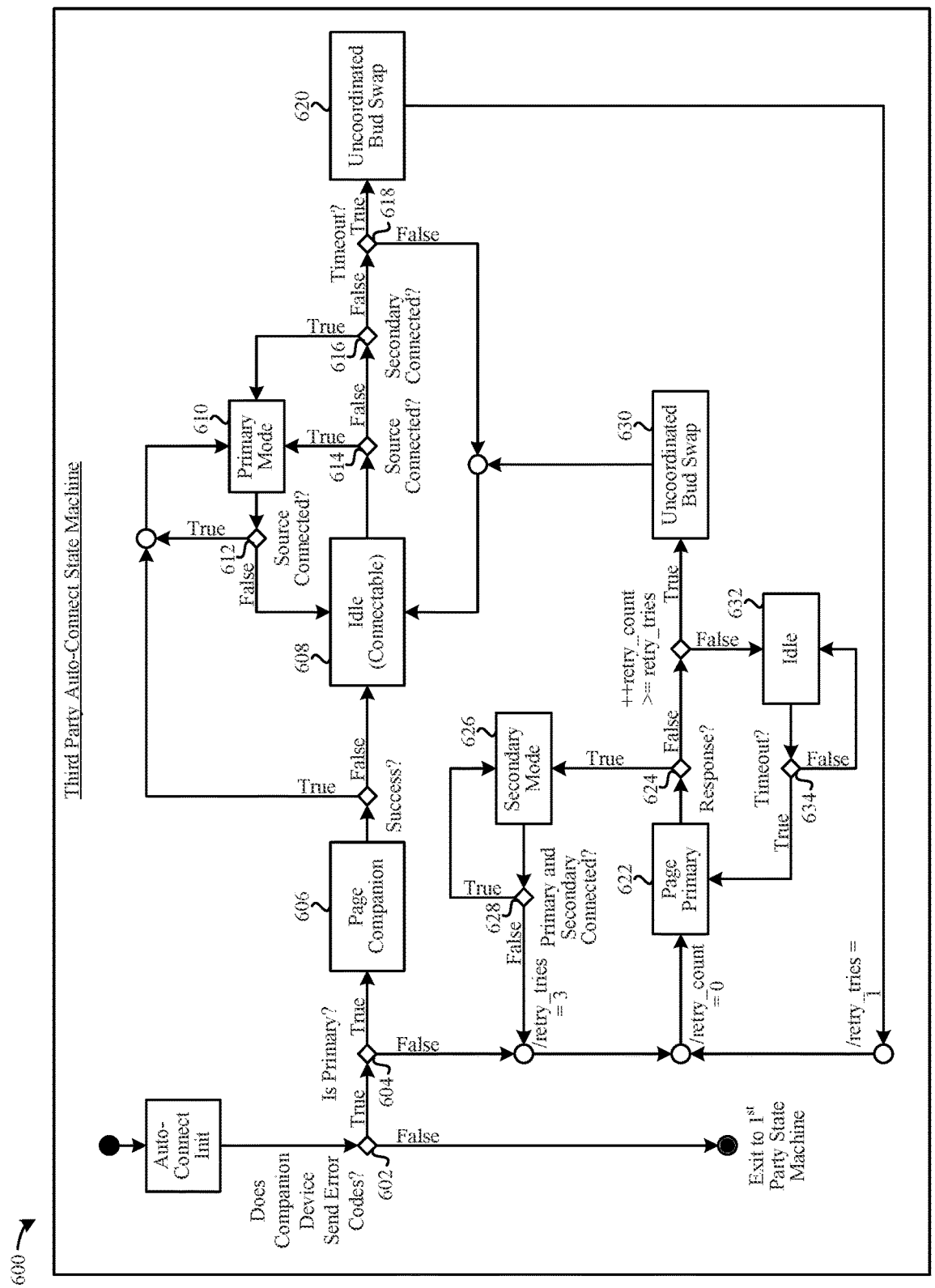
FIG. 6 illustrates an example flow of a wireless ear bud determining a mode to enter.

FIG. 6 illustrates a method 600 of a wireless ear bud determining a mode to enter according to some embodiments of the present technology. The method 600 determines 602 when a companion device does not provide error messages to a wireless ear bud when the wireless ear bud, in a primary role, attempts to wirelessly connect to the companion device already wirelessly connected to another wireless ear bud in a primary role. For example, the wireless ear bud can inspect a companion device profile (e.g., the companion device's mobile information device profile) and a database containing data about companion devices that are known to not send error messages and, if the companion device is listed in the stored data, the wireless ear bud determines that the companion device does not send the error messages.

When the companion device provides such an alert, the method 600 exits to a default protocol for determining when to swap roles, such as the coordinated and uncoordinated bud swap methods explained above. When the companion device does not send error messages to alert the wireless ear bud when it attempts to wirelessly connect in a primary role that another wireless ear bud is already wirelessly connected in a primary role, the method 600 involves determining 604 whether the wireless ear bud is currently in primary mode or secondary mode.

When the wireless ear bud is in the primary role, the wireless ear bud pages the companion device 606. If the wireless ear bud receives no response from the companion device, it enters an idle, connectable mode 608. The idle, connectable mode can involve the wireless ear bud being discoverable by the companion device and connectable to the companion device by initiating a connection sequence on the companion device—as opposed to an automatic connection. Initiating the connection can involve defining the primary and secondary roles.

If a response is received from the companion device, the wireless ear bud enters the primary role 610 and determines 612 if it has a wireless connection with the companion device. If the companion device is wirelessly connected, the wireless ear bud will stay in the primary role until the companion device is no longer wirelessly connected. If the companion device is not wirelessly connected, the ear bud becomes idle and connectable.

When an ear bud is in an idle, connectable mode 608 and when a companion device is wirelessly connected 614, the wireless ear bud can enter the primary role 610. When the companion device is not wirelessly connected, the wireless ear bud can determine 616 whether a wireless ear bud in a secondary role is connected with the companion device. If so, the wireless ear bud can enter the primary role 610. If a wireless ear bud is not connected in a secondary role, the wireless ear bud can remain in an idle, connectable mode 608 unless the method 600 reaches a predetermined timeout 618. When the method 600 times out, the wireless ear bud in the primary role can perform an uncoordinated bud swap 620.

When the method 600 determines 604 that a wireless ear bud is in the secondary role, or after a wireless ear bud in a primary role performs an uncoordinated swap 620 and changes roles to a wireless ear bud in a secondary role, the wireless ear bud in the secondary role pages for a wireless ear bud in a primary role 622 and determines 624 if it receives a response. If the wireless ear bud in the secondary role receives a response, the wireless ear bud can wirelessly connect in the secondary role 626 and can determine 628 if a wireless connection is active between the wireless ear bud in the secondary role and a wireless ear bud in a primary role. If so, the wireless ear bud in the secondary role remains in the secondary role 626.

When the ear bud in the secondary role is not wirelessly connected to a wireless ear bud in a primary role, the method 600 involves incrementing a counter (up to a threshold number) and performing the loop of paging for a wireless ear bud in a primary role again. When a wireless ear bud in the primary role is not found and the threshold counter number is reached, the wireless ear bud in the secondary role performs an uncoordinated swap 630 and enters the idle, connectable mode 608. When the wireless ear bud in the primary role is not found and the counter is not incremented, the wireless ear bud in the secondary role remains idle 632 until a timeout 634 occurs and then increments a counter and once again performs the loop of paging for a wireless ear bud in a primary role.

In some embodiments of the present technology, wireless ear buds have a right-ear configuration and a left-ear configuration. The wireless ear bud with a right-ear configuration and the wireless ear bud with the left-ear configuration can be programmed with different timeout periods such that when they undergo a process like that described in FIG. 6, the wireless ear buds' timeout periods will not overlap (or will not overlap for a threshold number of consecutive instances), which could create a loop.

In some embodiments, the wireless ear buds are not limited to wirelessly connecting in a simple pair. Three or more wireless ear buds can be involved in a role swapping protocol wherein one or more wireless ear buds were inactive and become active, replacing an active wireless ear bud in the primary or secondary role. As addressed above, should a situation arise where two or more wireless ear buds attempt to operate as the active ear bud in the primary role, they will resolve the conflict, as there can be only one wireless ear bud in the primary role at a time.

Figure 7A:
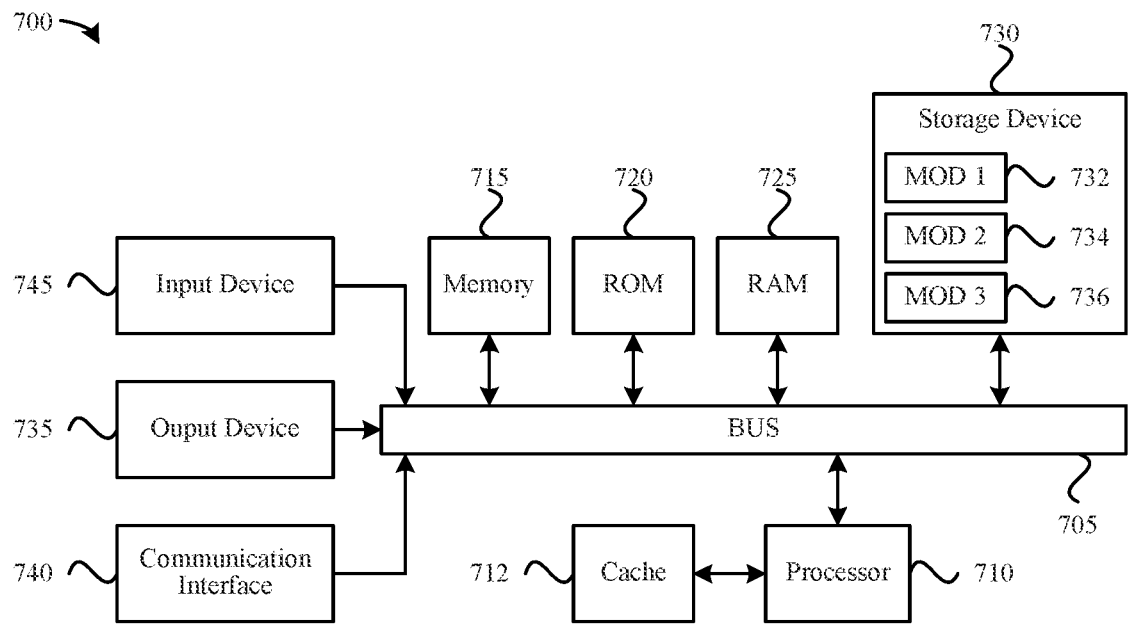
FIG. 7A and FIG. 7B illustrate example possible system embodiments.
Figure 7B:
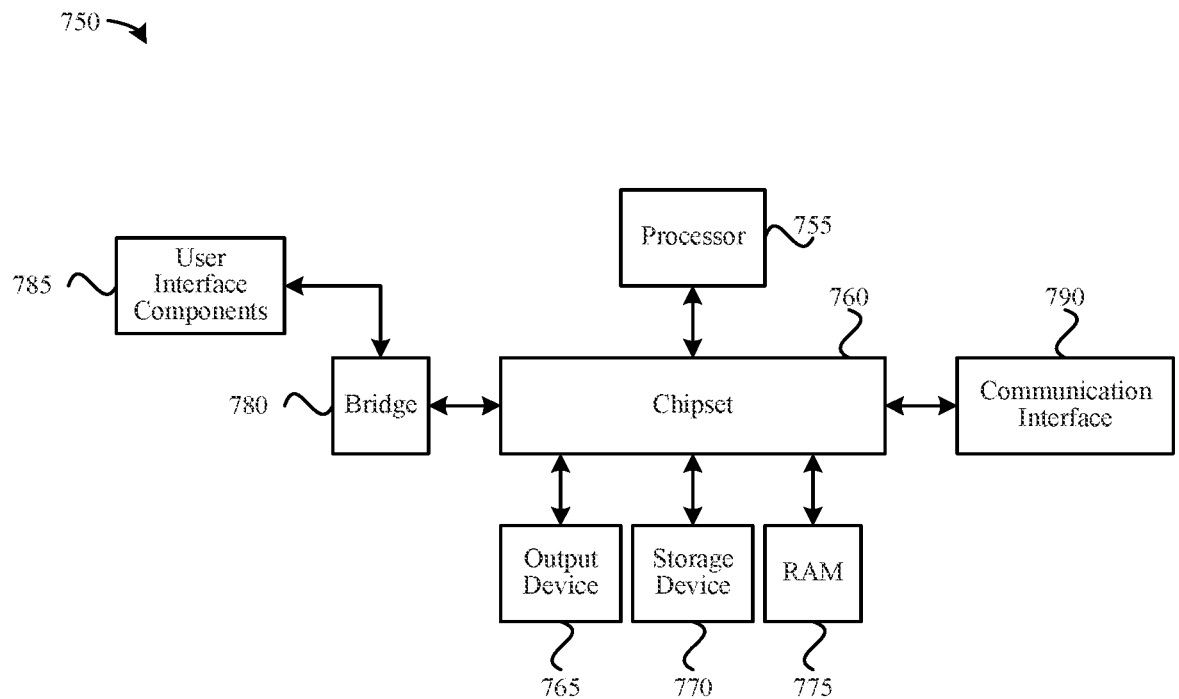

FIG. 7A and FIG. 7B illustrate exemplary system embodiments. Persons of ordinary skill in the art will also readily appreciate that other system embodiments are possible.

FIG. 7A illustrates a conventional system bus computing system architecture 700 wherein the components of the system are in electrical communication with each other using a bus 705. Exemplary system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media, which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include hardware and/or software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B illustrates an example computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that exemplary systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, Universal Serial Bus (USB) devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   by a wireless ear bud:
     responsive to detecting a trigger event, performing a role swap to change a configured role of the wireless ear bud,
     wherein:
       the wireless ear bud connects directly with a companion device when in a primary role,
       the wireless ear bud receives data indirectly from the companion device when in a secondary role, and
       the role swap is performed in a coordinated manner when the wireless ear bud has a wireless connection to a second wireless ear bud and is otherwise performed in an uncoordinated manner.

2. The method of claim 1, wherein when the role swap is coordinated, the wireless ear bud sends state information to or receives state information from the second wireless ear bud for use in performing the role swap.

3. The method of claim 1, wherein when the role swap is coordinated and the configured role of the wireless ear bud is the primary role, the wireless ear bud sends a swap message to the second wireless ear bud to trigger the role swap.

4. The method of claim 1, wherein when the role swap is coordinated and the configured role of the wireless ear bud is the secondary role, the wireless ear bud uses a device address of the second wireless ear bud to establish a wireless connection directly with the companion device as part of the role swap.

5. The method of claim 1, wherein the role swap is further performed in the coordinated manner when the wireless ear bud is wirelessly connected with the second wireless ear bud during at least a portion of the role swap.

6. The method of claim 1, wherein the wireless ear bud is not wirelessly connected with the second wireless ear bud when the role swap is performed in an uncoordinated manner.

7. The method of claim 1, wherein the triggering event comprises receipt of an instruction from the companion device to perform the role swap.

8. The method of claim 1, wherein the triggering event comprises detecting, by the wireless ear bud, a change from an out-of-ear state to an in-ear state while the configured role of the wireless ear bud is the secondary role.

9. The method of claim 1, wherein the triggering event comprises receipt of an error message from the companion device indicating the companion device is connected to another wireless ear bud configured to operate in the primary role.

10. The method of claim 1, wherein the triggering event comprises unsuccessfully attempting, by the wireless ear bud, to reconnect with the second wireless ear bud while the configured role of the wireless ear bud is the secondary role.

11. The method of claim 1, wherein the triggering event comprises detecting a battery level of the wireless ear bud is below a threshold battery level.

12. The method of claim 11, wherein the threshold battery level is based at least in part on a most recently obtained battery level of the second wireless ear bud.

13. The method of claim 1, further comprising:
    determining, by the wireless ear bud, after detecting the triggering event and before performing the role swap, that no criterion disallowing a role swap is satisfied.

14. The method of claim 1, further comprising:
    disallowing the role swap when the wireless ear bud is attempting to wirelessly connect with the companion device while the configured role of the wireless ear bud is the primary role.

15. The method of claim 1, further comprising:
    disallowing the role swap when the wireless ear bud is in a process of updating firmware of the wireless ear bud.

16. A wireless ear bud comprising:
    a processor; and
    a non-transitory computer-readable medium having instructions stored thereon, wherein the instructions, when executed by the processor, are effective to cause the wireless ear to:
      responsive to detecting a trigger event, performing a role swap to change a configured role of the wireless ear bud,
      wherein:
        the wireless ear bud connects directly with a companion device when in a primary role,
        the wireless ear bud receives data indirectly from the companion device when in a secondary role, and
        the role swap is performed in a coordinated manner when the wireless ear bud has a wireless connection to a second wireless ear bud and is otherwise performed in an uncoordinated manner.

17. The wireless ear bud of claim 16, wherein:
    the role swap is further performed in the coordinated manner when the wireless ear bud is wirelessly connected with the second wireless ear bud during at least a portion of the role swap; and
    the wireless ear bud is not wireless connected with the second wireless ear bud when the role swap is performed in an uncoordinated manner.

18. The wireless ear bud of claim 16, wherein:
    when the role swap is coordinated, the wireless ear bud sends state information to or receives state information from the second wireless ear bud for use in performing the role swap.

19. The wireless ear bud of claim 16, wherein:
the triggering event comprises receipt of an error message from the companion device indicating the companion device is connected to another wireless ear bud configured to operate in the primary role.

20. A non-transitory computer-readable medium storing instructions that, when executed by a processor of a wireless ear bud, cause the wireless ear bud to perform actions including:
responsive to detecting a trigger event, performing a role swap to change a configured role of the wireless ear bud,
wherein:
the wireless ear bud connects directly with a companion device when in a primary role,
the wireless ear bud receives data indirectly from the companion device when in a secondary role, and
the role swap is performed in a coordinated manner when the wireless ear bud has a wireless connection to a second wireless ear bud and is otherwise performed in an uncoordinated manner.

\* \* \* \* \*